(12) United States Patent
Jakilinki et al.

(10) Patent No.: US 8,190,500 B2
(45) Date of Patent: May 29, 2012

(54) RUNTIME ENVIRONMENT SALES SETTLEMENT

(75) Inventors: Jagannadha R. Jakilinki, Collegeville, PA (US); Gopinath Sundaram, East Brunswick, NJ (US); Michael Bonomo, Clinton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 125 days.

(21) Appl. No.: 12/633,075

(22) Filed: Dec. 8, 2009

(65) Prior Publication Data

US 2011/0137774 A1 Jun. 9, 2011

(51) Int. Cl.
*G07F 19/00* (2006.01)

(52) U.S. Cl. ............... 705/34; 705/30; 705/37; 705/54; 705/1; 705/80; 705/345

(58) Field of Classification Search .................... 705/34, 705/30, 54, 345
See application file for complete search history.

(56) References Cited

U.S. PATENT DOCUMENTS

| | | | |
|---|---|---|---|
| 7,099,846 B1 * | 8/2006 | Ishibashi et al. | 705/51 |
| 7,184,986 B2 * | 2/2007 | Ishibashi et al. | 705/52 |
| 7,689,516 B2 * | 3/2010 | Burchetta et al. | 705/80 |
| 2001/0044786 A1 * | 11/2001 | Ishibashi | 705/77 |
| 2003/0120502 A1 * | 6/2003 | Robb et al. | 705/1 |
| 2004/0138970 A1 * | 7/2004 | Ramachandran et al. | 705/34 |
| 2007/0214030 A1 * | 9/2007 | Shear et al. | 705/8 |
| 2007/0295803 A1 * | 12/2007 | Levine et al. | 235/379 |
| 2008/0126266 A1 * | 5/2008 | Burchetta et al. | 705/80 |
| 2008/0243725 A1 * | 10/2008 | Homan-Muise et al. | 705/400 |
| 2009/0106100 A1 * | 4/2009 | Mashinsky | 705/14 |

* cited by examiner

*Primary Examiner* — Vanel Frenel

(57) ABSTRACT

A system may include an enterprise content settlement server including an extract, transfer and load process configured to receive a first set of usage data and a second set of usage data. The system may further include an enterprise content settlement engine configured to settle the first set of usage data and the second set of usage data according to a contract including at least one settlement rule.

23 Claims, 9 Drawing Sheets

| Transaction ID | Date/Time | Bill Flag | Event Type | Vendor | Product ID | Product Name | Price |
|---|---|---|---|---|---|---|---|
| 00011234 | 9/19/2009 11:34 | Y | DL | RingCorp | RNG0001 | RingTone 1 | $0.99 |
| 00011235 | 9/19/2009 11:35 | Y | DL | Vendor, Inc. | VEND0012 | MyPhone | $0.99 |
| 00011236 | 9/19/2009 11:35 | Y | DL | Vendor, Inc. | VEND0014 | MyPhone | $0.99 |
| 00011237 | 9/19/2009 11:35 | Y | DL | Sound, Inc. | VEND0321 | SoundSter 3.0 | $0.99 |
| 00011238 | 9/19/2009 11:36 | Y | DL | Vendor, Inc. | VEND0122 | WeatherGet | $1.99 |

| Vendor | Product ID | Product Name | Count | Adjusted Count | Usage Amount | Adjusted Usage Amount | Net Usage Amount |
|---|---|---|---|---|---|---|---|
| Vendor, Inc. | VEND0012 | MyPhone | 443,104 | 1,974 | $1,024,411.81 | ($8,772.04) | $1,015,639.77 |
| Sound, Inc. | VEND0321 | SoundSter | 177,748 | 1,202 | $919,967.31 | ($6,040.79) | $913,926.52 |
| TemperCon | VEND0122 | WeatherGet | 234,526 | 2,194 | $640,432.17 | ($8,712.66) | $631,719.51 |
| Vendor, Inc. | VEND0014 | MyPhone | 198,888 | 1,324 | $525,837.38 | ($5,509.86) | $520,327.52 |
| RingCorp | RNG0001 | RNG1 | 115,000 | 1,641 | $414,613.12 | ($5,109.33) | $409,503.79 |

510

| Vendor | Product ID | Product Name | Service Provider Count | Aggregator Count | Aggregator Count Diff | Service Provider Adj Count | Aggregator Adj Count | Adjustment Count Diff | Service Provider Usage Amount | Aggregator Usage Amount | Service Provider Usage Amount Diff |
|---|---|---|---|---|---|---|---|---|---|---|---|
| Vendor, Inc. | VEND0012 | MyPhone | 69 | 67 | -2 | 0 | 0 | 0 | $125.93 | $121.11 | ($4.82) |
| Sound, Inc. | VEND0321 | SoundSter | 12,940 | 12,917 | -23 | 161 | 161 | 0 | $23,128.54 | $23,086.51 | ($42.03) |
| TemperCon | VEND0122 | WeatherGet | 13 | 13 | 0 | 0 | 0 | 0 | $30.07 | $30.07 | $0.00 |
| Vendor, Inc. | VEND0014 | MyPhone | 197,457 | 196,743 | -714 | 3,134 | 3,139 | 5 | $520,054.48 | $517,965.96 | ($2,088.52) |
| RingCorp | RNG0001 | RNG1 | 65,214 | 65,075 | -139 | 928 | 930 | 2 | $104,516.66 | $104,310.15 | ($206.51) |

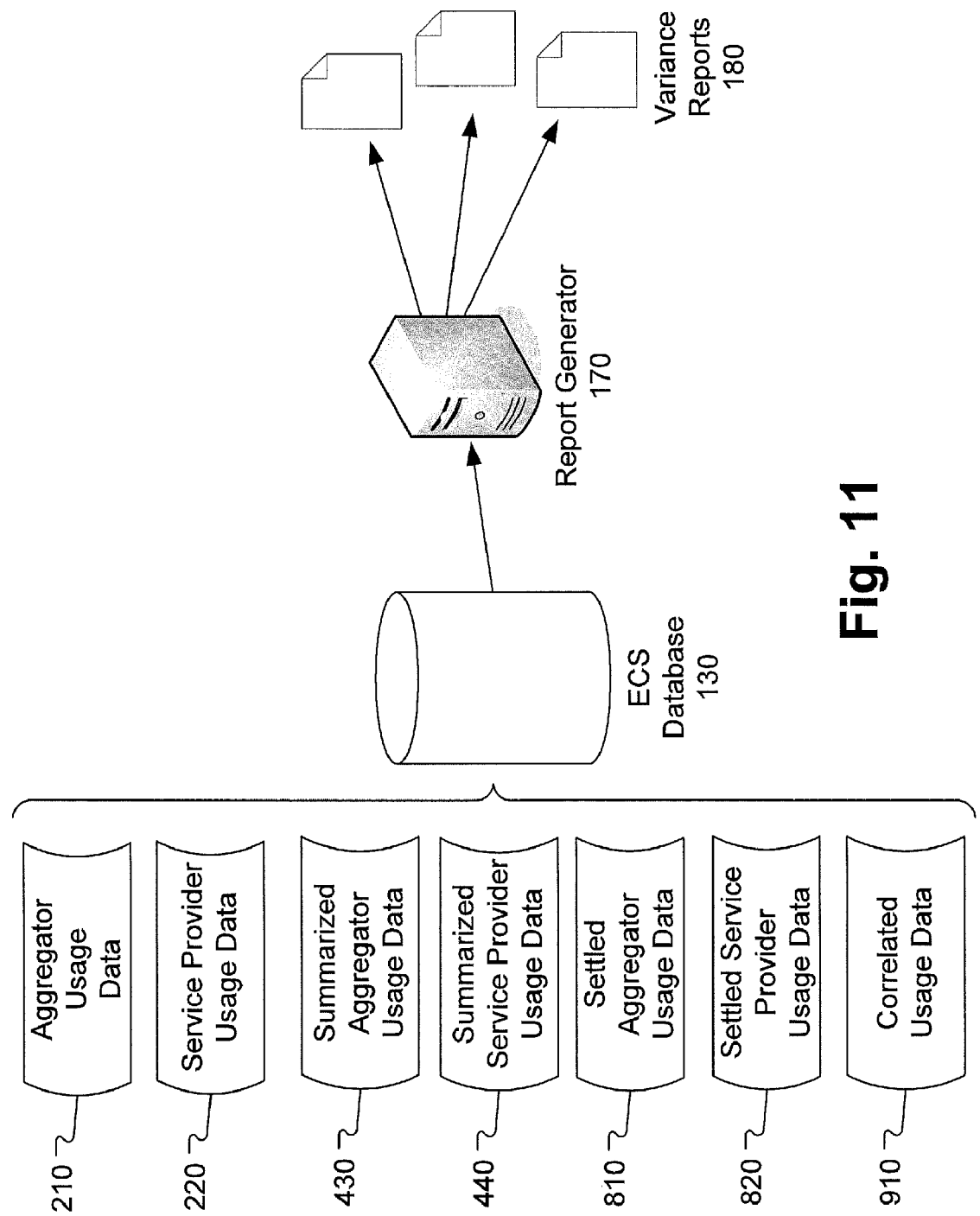

RUNTIME ENVIRONMENT SALES SETTLEMENT

BACKGROUND

Computerized settlement systems may receive significant amounts of data from various sources, where the data may represent significant quantities of transactions. However, data received from the various sources may include differences in count and charge amount relating to the underlying transactions. These differences may be referred to as variances. Variances in the data may need to be identified in order to determine their cause. Additionally, variances may need to be reconciled to settle any potential disputes. Accordingly, reconciling data quickly and correctly may be critical to proper functioning and revenue sharing for the computerized settlement systems.

BRIEF DESCRIPTION OF THE DRAWINGS

FIG. 10 illustrates exemplary correlated settled aggregator usage data.

FIG. 11 illustrates an exemplary data flow for generating variance reports.

DETAILED DESCRIPTION

Figure 1:
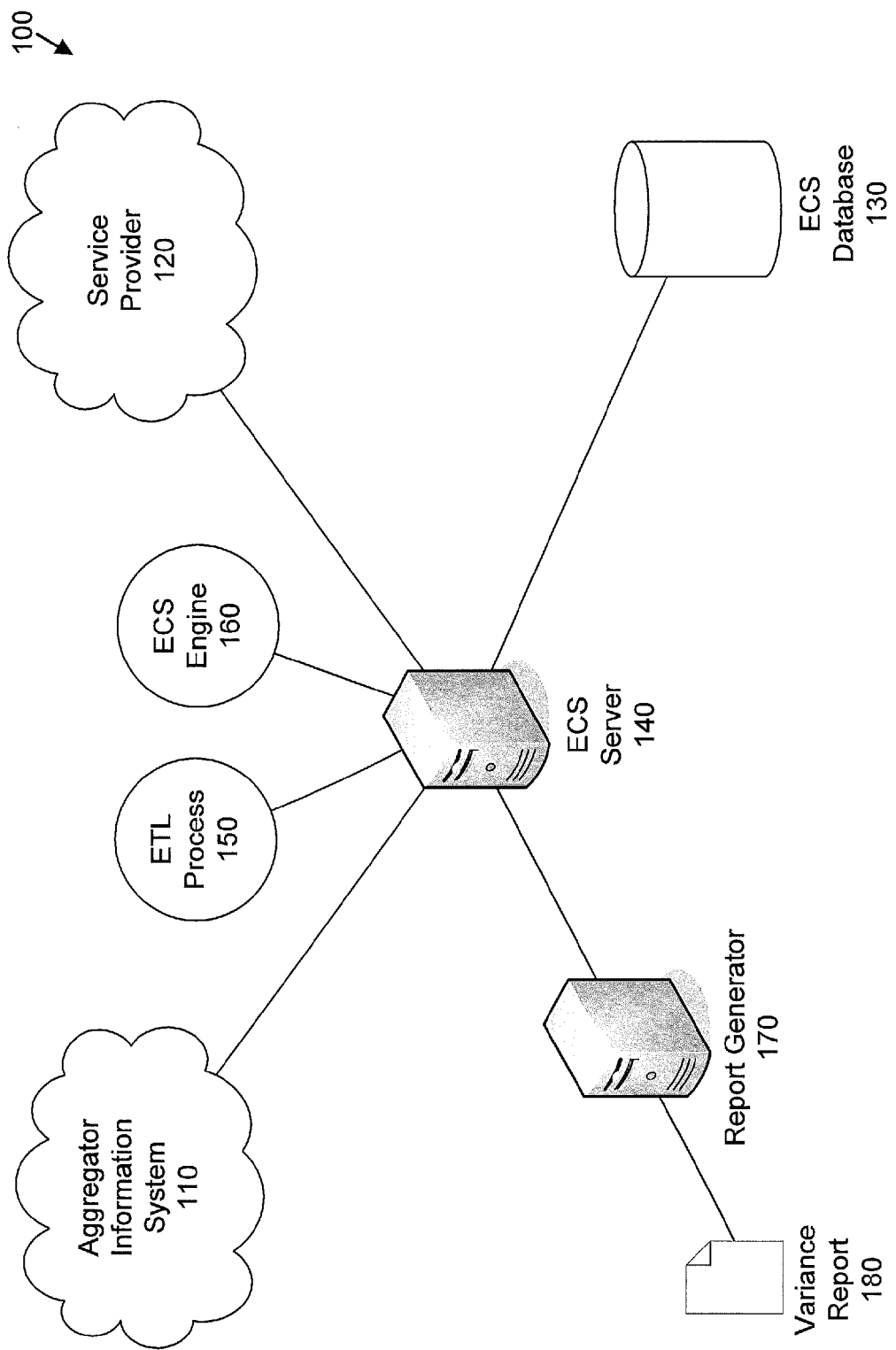
FIG. 1 illustrates an exemplary system for reconciling billing between a service provider and an aggregator.

A service provider may provide communications services, including one or more sales platforms that may allow buyers and sellers to perform transactions over a communications network. An aggregator may be a third-party in selective communications with a service provider and one or more independent software vendors. The aggregator may use facilities provided by one or more of the sales platforms to aggregate and provide products (e.g., goods or services) to subscribers of the communications network. Some of the products being provided may be products of the aggregator, while other products may be products of one or more independent software vendors for which the aggregator may provide distribution services.

A subscriber may select to purchase a product of a vendor or an aggregator via the aggregator. The subscriber may be charged a fee to receive the product by the service provider, and may receive the product over the communications network. The service provider may bill the subscriber for the charges, and the aggregator may send a report to the service provider indicating a portion of the charges owed to the aggregator. As a simple example, a mobile phone subscriber may select to download a ringtone over a cellular telephone network from an aggregator associated with a ringtone vendor. A fee for the ringtone may be charged against the account of the subscriber by the service provider, and the aggregator may send a report to the service provider indicating a charge owed to the aggregator for the download. Accordingly, the transaction may be completed between the ringtone vendor and the subscriber over the communications network via the sales platform.

With regard to the charge associated with the product, the total amount of the charge to be paid by the subscriber may be determined according to predefined rules. Additionally, any portion to be credited to the aggregator, and any portion to be credited to the service provider may also be determined according to predefined rules. If the product is determined to be a product of a vendor and not of the aggregator, then an appropriate portion of the total charge to be credited to the vendor may also be determined. A contract between the aggregator and the service provider may provide the rules for a fee sharing relationship between the aggregator and the service provider. Additionally, a contract between the service provider and a vendor may provide rules for fee sharing relationships between the service provider and the vendor. The fee may include money or other goods or services in lieu of money.

Many such transactions between vendors and subscribers may occur over a billing period. In addition, manual or bulk adjustments of the usage records may occur over the period. At the end of a period, an invoice may be prepared from the usage records indicating the charges owed to the aggregator (and/or to each vendor) as well as the charges owed to the service provider. The invoice may be determined according to predefined rules included in portions of one or more contracts. Such an invoice may be prepared by the aggregator, the service provider, or by both.

Data collected during the period by the aggregator and by the service provider may differ from one other or as compared with the invoiced amounts. These variances may need to be determined and reconciled. Generally speaking, reconciling an account may be performed to ensure a correct account balance and to provide outside auditors with reviewable documentation supporting the account balance. Reconciling an account may include proving or otherwise documenting that an account balance is correct. As an example, a balance in a general ledger account may be reconciled against a balance indicated on a statement from a bank. As another example, an amount of funds in a freight payable account may be reconciled against shipment records of recent sales, while making a determination of how much would be required to be paid for the freight charges associated with those sales.

With regard to a sales platform, a system may reconcile the usage data information including periodically summarizing the usage data recorded by the aggregator, periodically summarizing the usage data recorded by the service provider, settling the summarized usage data information recorded by the aggregator, settling the summarized usage data information recorded by the service provider, correlating the settled usage data information, and determining variances in the usage data information.

Accordingly, the system may determine a portion of a charge to be credited to one account or party and a portion to be credited to another account or party. The system may further determine variances between an invoice prepared by an aggregator or a service provider against the settled usage data information. As an example, if both the aggregator and the service provider agree that the aggregator is to be credited $100, then both parties agree and no variance exists. However, if an aggregator determines that it is owed $100, while the service provider determines that the aggregator is only owed $80, a variance of $20 may be indicated.

In some instances, a dispute resolution procedure may be instituted between an aggregator and a service provider based on a disagreement relating to one or more charged amounts. To facilitate resolution of the dispute, the system may use reviewable documentation supporting the charged amount, including summarized and detailed usage data records, determined variances in the records, and logged instances of any potential adjustments.

FIG. 1 illustrates an exemplary system 100 having an aggregator information system 110, a service provider information system 120, and an enterprise content settlement (ECS) database 130. The system 100 may include an ECS server 140 having an extract, transfer and load (ETL) process 150 and an ECS engine 160, where the ECS server 140 may be in selective communication with the aggregator information system 110, the service provider information system 120, and the ECS database 130. The ECS server 140 may further be in selective communication with a report generator 170 that may generate variance reports 180. System 100 may take many different forms and include multiple and/or alternate components and facilities. While an exemplary system 100 is shown in FIG. 1, the exemplary components illustrated in the Figure are not intended to be limiting. Indeed, additional or alternative components and/or implementations may be used.

As illustrated in FIG. 1, the system 100 may include an aggregator information system 110. An aggregator may aggregate products available from a plurality of vendors and also products available from the aggregator itself into a single product source. Accordingly, the aggregator information system 110 may make one or more products available over a service provider network, such as through use of an application download server farm in selective communication with the service provider network. As an example, a subscriber of the service provider may request to download a product from a vendor (e.g., a game, a ringtone, a sports information software application, a stock information software application, a mapping application, a global positioning system (GPS) navigation application, or a weather forecast software application). This request may be routed to an application download server in an application download server farm associated with the vendor. The application download server may handle the download portion of the transaction, and the aggregator information system 110 may accordingly create one or more records based on the transaction.

The system may further include a service provider information system 120. The service provider information system 120 may also maintain records of subscriber transactions, but from a network service provider standpoint. As mentioned above, a subscriber of the service provider may request to download a product from a vendor. The service provider information system 120 may accordingly maintain transaction records including user events for each transaction as recorded by devices on the service provider network, such as network switching devices. Moreover, as the service provider may be responsible for collecting fees from the subscribers, the records may further include amounts that may be billed to the subscriber as well as amounts to be used for fee sharing calculations.

The system may further include an ECS database 130. The ECS database 130 may include one or more data storage mediums, devices, or configurations, and may employ various types, forms, and/or combinations of storage media, including but not limited to hard disk drives, flash drives, read-only memory, and random access memory. The ECS database 130 may include various technologies useful for storing and accessing any suitable type or form of electronic data, which may be referred to as content. Content may include computer-readable data in any form, including, but not limited to video, image, text, document, audio, audiovisual, metadata, and other types of files or data. Content may be stored in a relational format, such as via a relational database management system (RDBMS). As another example, content may be stored in a hierarchical or flat file system. Exemplary data elements that may be stored in the ECS database 130 are discussed in further detail in the figures below.

The system 100 may further include an ECS server 140. The ECS server 140 may be implemented as a combination of hardware and software, and may include one or more software applications or processes for causing one or more computer processors to perform the operations of the ECS server 140 described herein.

An ETL process 150 may be one application included on the ECS server 140, wherein the ETL process 150 may be implemented at least in part by instructions stored on one or more computer-readable media. The ETL process 150 may include instructions to cause the ECS server 140 to extract data from aggregator information systems 110 and the service provider information system 120, to perform summarization operations on extracted data to facilitate data analysis, and also to facilitate the transfer and loading of the extracted and/or summarized data into the ECS database 130.

An ECS engine 160 may be another application included on the ECS server 140. The ECS engine 160 may include instructions that when executed may cause the ECS server 140 to analyze content received and summarized according to the ETL process 150 that may be stored in the ECS database 130. As discussed in detail below, the ECS engine 160 may analyze the usage data records from the aggregator information systems 110 and the service provider information system 120 in raw and/or summarized form, settle the usage data information received from the aggregator, settle the usage data information received from the service provider, correlate the settled usage data information, and determining variances in the usage data information. The ECS engine 160 may further determine variances between an invoice prepared by an aggregator or service provider and the settled usage data information.

Computer-executable instructions may be compiled or interpreted from computer programs created using a variety of well known programming languages and/or technologies, including, without limitation, and either alone or in combination, Java™, C, C++, Visual Basic, Java Script, Perl, PL/SQL, etc. The ECS engine 160 and ETL process 150 may be written according to a number of these and other programming languages and technologies, or a combination thereof.

The system 100 may further include a report generator 170. The report generator 170 may be a computing device configured to receive data including the received, settled and correlated records, and generate one or more variance reports 180 according to the analysis performed by the ECS engine 160. Generally, a variance report 180 may include one or more variances, such as variances regarding transaction count for one or more products, and charge amounts for one or more products. Exemplary formats for the generated reports may include Microsoft Word documents, Portable Document Format (PDF) documents, Microsoft Excel spreadsheets, and HyperText Markup Language (HTML) documents.

In general, computing systems and/or devices, such as ECS database 130, ECS server 140, and report generator 170, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices, such as ECS database 130, ECS server 140, and report generator 170 generally include computer-executable instructions, where the instructions may be executable by one or more computing devices such as those listed above. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, such as ECS database 130, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While FIG. 1 illustrates an exemplary system 100, other implementations may be used. In some implementations, additional elements may be included or elements shown in FIG. 1 may be omitted or modified. For example, one or more of the ECS database 130, the ECS server 140, and the report generator 170 may be combined in certain implementations. As another example, a system may include multiple aggregator information systems 110. In still further examples, ETL process 150 and ECS engine 160 may be combined, or ETL process 150 and ECS engine 160 may be implemented on multiple or separate ECS servers 140.

Figures 2, 3:
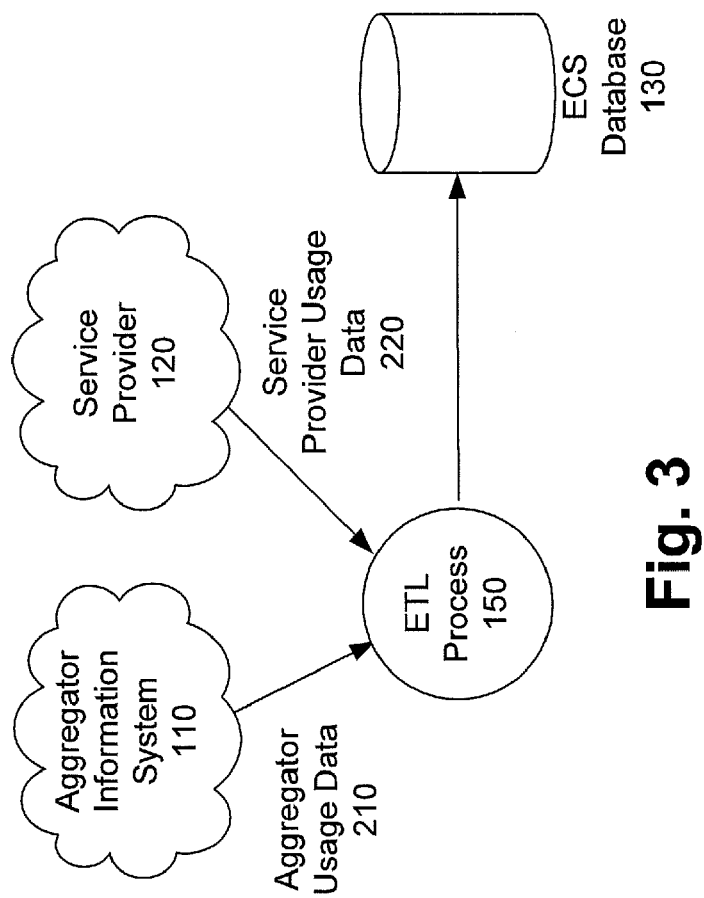
FIG. 2 illustrates exemplary raw data that may be recorded by a service provider or an aggregator.
FIG. 3 illustrates an exemplary data flow for aggregator usage data and service provider usage data.

FIG. 2 illustrates exemplary raw data that may be recorded by a service provider or an aggregator. Data records similar to the exemplary records shown in FIG. 2 may be recorded by the aggregator information system 110 and/or a service provider information system 120.

As illustrated in the example, each record may include a unique identifier identifying the transaction record as well as information identifying a date and time at which the record was recorded. Each record may also include a bill flag, sometimes referred to as a costed flag. Transactions for which an amount is billed to a subscriber may be referred to as costed, while transactions for which no amount is billed to a subscriber may be referred to as uncosted. Examples of uncosted transactions may include free downloads, and errored-out transactions.

Each record may include an event type indicating a type of event included in the corresponding record. Exemplary types of events may include a download (DL) event, and an adjustment event. A download event may indicate that the record includes information regarding a product downloaded by a subscriber. An adjustment event may include information regarding a full or partial reversal of a list price associated with product downloads. It should be noted that in some instances amounts billed to subscribers may be adjusted in bulk updates through application of a bulk adjustments file rather than through event records, where the bulk adjustments file includes one or more adjustments to be applied.

Each record may also include information regarding the downloaded product. For example, the record may indicate a part number that identifies the downloaded product, a manufacturer or independent software vendor associated with the downloaded product, and an application name of the downloaded product. Each record may also include pricing information, including for example, a price for the subscriber to pay for the downloaded product or the developer price that the aggregator might charge the service provider.

Although not illustrated, in some instances the records may include one or more additional data fields, such as a name and type of a subscriber device used to download the product, a subscriber mobile device number, a subscriber account number, a subscriber network plan identifier, and a communications point code at which a download was requested. In other instances, one or more of the illustrated fields may be combined or excluded from the records.

FIG. 3 illustrates an exemplary data flow for aggregator usage data 210 and service provider usage data 220. As illustrated in FIG. 3, the ETL process 150 as implemented by an ECS server 140 may be configured to receive aggregator usage data 210 from the aggregator information system 110 and service provider usage data 220 from the service provider information system 120. The ETL process 150 may further be configured to forward the aggregator usage data 210 and service provider usage data 220 to the ECS database 130.

The aggregator information system 110 may provide a feed indicating what products are being purchased by what subscribers. This feed may include transaction data periodically compiled by the aggregator information system 110 into one or more aggregator usage data 210 files. The aggregator usage data 210 files may include data similar to that illustrated above with regard to FIG. 2. For example, the aggregator information system 110 may create an aggregator usage data 210 file encoded in an eXtensible Markup Language (XML) format every half-hour including the records recorded for the corresponding previous half-hour period. As another example, the aggregator information system 110 may further periodically create daily aggregator usage data 210 files instead of or in addition to the semi-hourly aggregator usage data 210 files.

The aggregator usage data 210 file may be made available for download by the ETL process 150. Likewise, the ETL process 150 may accordingly be configured to download the aggregator usage data 210. In other examples, the aggregator usage data 210 file may be periodically sent by the aggregator information system 110 to the ECS server 140, and may be received according to the ETL process 150.

The ETL process 150 may perform error correction on the received aggregator usage data 210, and may attempt to retry download operations in case of error. For example, the ETL process 150 may perform a check of the received aggregator usage data 210 file to determine whether the file was corrupted during the download process. To make the determination, the ETL process 150 may receive a hash code computed by the aggregator information system 110 associated with the aggregator usage data 210 file, such as a message-digest algorithm 5 (MD5) hash code or a secure hash algorithm (SHA) hash code. The received hash code may then be compared to a hash code computed by the ETL process 150 on the received aggregator usage data 210 file using the same or a similar hash algorithm. If these two hash values differ, then the ETL process 150 may determine that the aggregator usage data 210 file may have been corrupted in transit. Accordingly, the ETL process 150 may request retransmission of the aggregator usage data 210 file.

The ETL process 150 may support files of multiple types and formats. Exemplary file types may include Excel files, XML files, delimited files (e.g, tab delimited, comma delimited), and files having fields of fixed-width. The ETL process 150 may further validate that the file is of a supported format, and may reject the file if it is not in a proper format. The ETL process 150 may additionally perform validation on a received file. For example, the ETL process 150 may determine whether a received file is a duplicate of another received file according to one or more file attributes, such as file name, file size, and file date stamp.

The ETL process 150 may also perform field validation on a file to ensure that records include data in an appropriate format for the indicated field. As an example, the ETL process 150 may validate that a numeric field includes numeric data, and may reject a record that includes data in an invalid format. The ETL process 150 may further validate the contents of particular fields. For example, the ETL process 150 may verify that identifiers are included in a record, and that the included identifiers are valid. Exemplary identifiers that may require inclusion or validation may include a vendor identifier identifying a particular vendor, a product identifier that may identify a particular product, and a contract identifier that may identify a particular contract.

In some instances, the ETL process 150 may perform auto-correction on record of a received file. For example, in some instances a vendor name may be included in records of the aggregator usage data 210 file. However, the vendor name may not always be specified consistently, or the vendor name may frequently change. Accordingly, the ETL process 150 may be configured to map the vendor name to a vendor identifier that may be consistently used by the system.

In any event, the ETL process 150 may be configured to accept a file if it contains up to a configurable threshold amount of errors (e.g., 5% of the records include errors, 10% of the records include errors), and to reject the file if it exceeds the threshold amount of errors.

If the ETL process 150 determines that the aggregator usage data 210 file has been properly received and verified (e.g., of a supported file type, not a duplicate, fewer than a threshold amount of errors, etc.), then the aggregator usage data 210 file may store in the ECS database 130 a reference to a location in the file system at which the aggregator usage data 210 file may be stored. The aggregator usage data 210 file accordingly be maintained in the file system as a raw full file, and may be retained as supporting documentation. The aggregator usage data 210 file may additionally be stored in association with additional metadata, such as the time of receipt of the aggregator usage data 210 file, the hash code for the aggregator usage data 210, an identifier indicating the period of time for which the aggregator usage data 210 file represents, an identifier indicating the aggregator information system 110 from which the aggregator usage data 210 file was sent, a unique database identifier for the aggregator usage data 210 file.

Aggregator usage data 210 file may further be imported into the ECS database 130 as a set of database records, wherein each record imported into the ECS database 130 including one record of data included in the aggregator usage data 210 file. In some instances, a process identifier of the process that added the records to the ECS database 130 may be associated with each the added records. Each of these records may further be associated with the unique database identifier associated with the aggregator usage data 210 file from which the record was imported. Exemplary unique database identifiers may include integers, globally unique identifiers (GUID), and Universally Unique Identifiers (UUID), among others. For instance, a unique integer may be assigned to the file by the ECS database 130 according to an auto-increment database field.

It should be noted that in some instances it may be determined that a received file may have been inaccurate or corrupt. Because the process identifier may be stored with the records when they are added, the records may be rolled back from the ECS database 130 based on the process that added the records to the ECS database 130. Accordingly, the process identifier of the process that added the records may be used to aid in performing a database rollback of inaccurate or corrupt records.

Additionally, similar to as discussed above, the service provider information system 120 may also provide a service provider usage data 220 feed indicating what product is being purchased by what subscribers. As an example, a service provider usage data 220 file may be made available for download by the ETL process 150, and the ETL process 150 may be configured to download the service provider usage data 220. As another example, the service provider usage data 220 file may be periodically sent by the service provider information system 120 to the ECS server 140, and may be received according to the ETL process 150.

This service provider usage data 220 feed may include transaction data periodically compiled by the service provider information system 120 into one or more service provider usage data 220 files. The aggregator usage data 210 files may also include data similar to that illustrated above with regard to FIG. 2. As an example, the service provider information system 120 may create a service provider usage data 220 file as a Microsoft Excel format spreadsheet or a delimited file every half-hour. As another example, the service provider information system 120 may periodically create daily service provider usage data 220 files instead of or in addition to the semi-hourly service provider usage data 220 files.

The service provider usage data 220 file may similarly be downloaded using an error checking process according to the ETL process 150. Similar to as discussed above, the service provider usage data 220 file may be stored in the ECS database 130 along with metadata, and the records included in the service provider usage data 220 file may be imported into the ECS database 130 as a set of database records associated with the service provider usage data 220 file.

Figure 4:
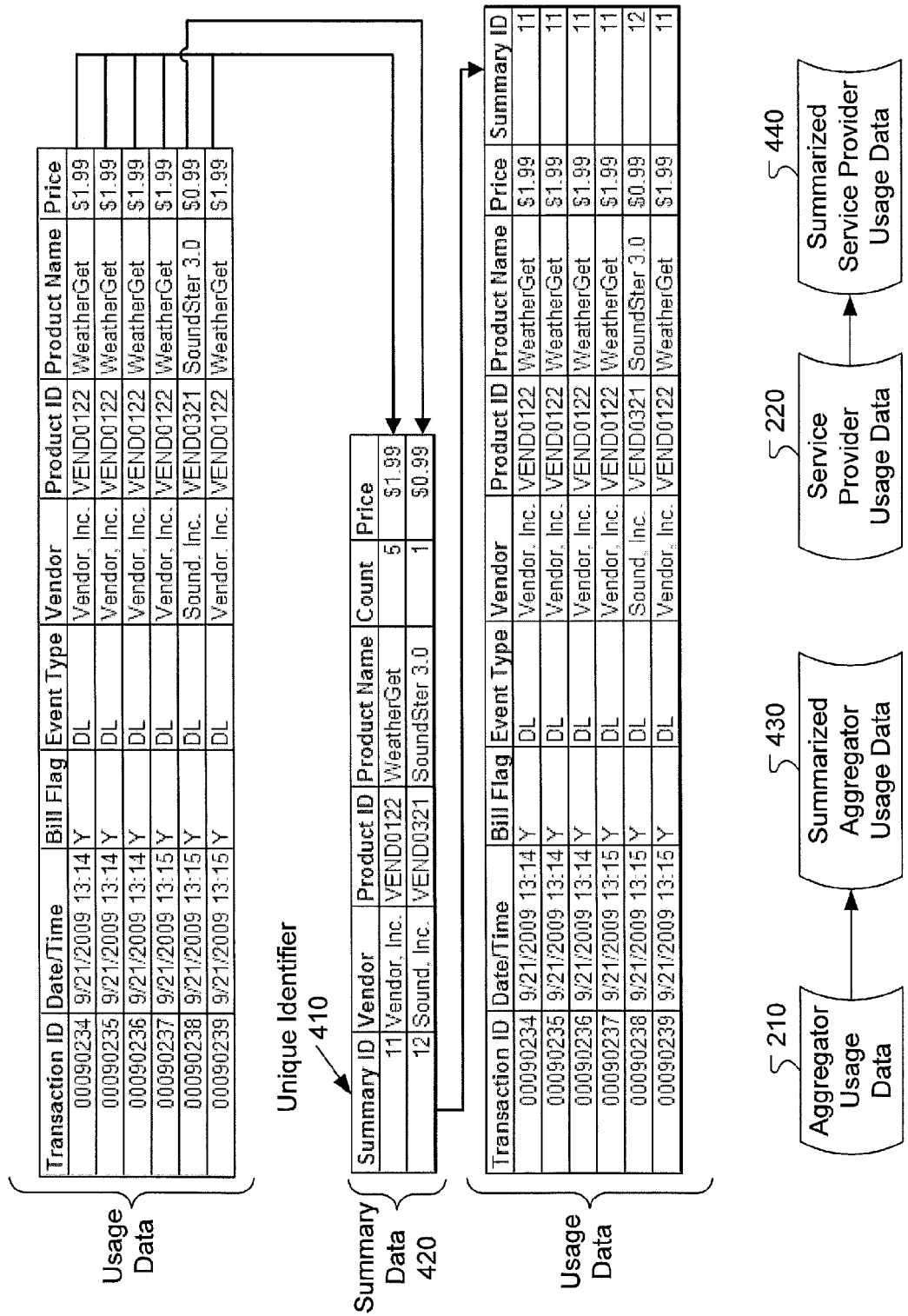
FIG. 4 illustrates an exemplary calculation of summarized aggregator usage data and summarized service provider usage data.

FIG. 4 illustrates an exemplary calculation of summarized aggregator usage data 430 and summarized service provider usage data 440. The ETL process 150 may perform summarization operations on the aggregator usage data 210 to provide summarized aggregator usage data 430. The ETL process 150 may further perform summarization operations on the service provider usage data 220 to provide summarized service provider usage data 440.

The data extracted from the aggregator information system 110 and the service provider information system 120 may include significant amounts of transactions representing substantial quantities of charges. Accordingly, to facilitate efficient data processing, the ETL process 150 may perform summarization operations on one or more sets of usage data to provide summary data 420 determined from the usage data. To provide reviewable documentation of the underlying data used to generate the summary data 420, the summary data 420 may further be linked back to the usage data to provide reviewable documentation of the underlying data used to generate the summary data 420.

Exemplary summarization operations may include combining similar data rows into a single data row with a count field along with any other summarized information (e.g. sum of charge amounts) to indicate the number of combined records, and including only relevant data fields in the summary data 420 to the exclusion of data fields unnecessary for later data processing. As one example, a usage data 220 file may include fields such as a unique identifier 410 for a record, a subscriber mobile device number, a subscriber account number, a subscriber network plan identifier, a communications point code at which a download was requested, and a time of day. One or more of these or other fields may be unnecessary for later processing, and accordingly may be excluded from a set of summary data 420 created according to the usage data file. As another example, rather than including a plurality of records each indicating one download of a product, a single record for each unique product with at least one download may be included in a summarized version of the usage data 220 file, with a numeric count field indicating the count of downloads for the corresponding product. Accordingly, through these and other summarization operations, a set of summary data 420 may be created from the usage data 220 file to use instead of or in addition to the raw usage data in further data processing.

The summary data 420 may further be linked back to the raw usage data to allow for detailed analysis of the underlying data used to generate the summary data 420. As indicated above, each record of the summary data 420 may include data from one or more rows of raw usage data, such that the data included may be relevant to the settlement process. Additionally, each record of the summary data 420 may also be assigned a unique identifier 410. Through use of the unique identifiers 410, each of the rows in the raw usage data that are summarized by the record of the summary data 420 may be associated back to the unique identifier 410 corresponding to the summary record. In some instances, this may be accomplished through addition of a field to the raw usage data that may be filled with the according unique identifier 410 of the corresponding record of the summary data 420. Through use of the unique identifiers 410, each record in the raw usage data that contributed to a particular record of the summary data 420 may be queried for in the raw usage data and may be selectively retrieved.

Additionally, summarization operations may be performed on the summary data 420 to create higher-level summary data 420. As some examples, higher-level summary data 420 may further summarize the data to include fewer fields, or may summarize a longer time period into one set of summary data 420. Creating higher-level summary data 420 of previously created summary data 420, rather than based on raw usage data records may facilitate the creation of higher-level summary data 420 by improving the speed of creation and decreasing the amount of database access and processor time required.

As an example, higher-level summarized aggregator usage data 430 may be created from a set of lower-level summarized aggregator usage data 430, rather than from performing a second summarization of the raw aggregator usage data 210 directly. Similar to as discussed above, each record in the higher level summarized aggregator usage data 430 may be assigned a unique identifier 410, which may be associated back to each contributing record of the lower-level summarized aggregator usage data 430. Accordingly, by using the unique identifier 410 of the higher-level summarized aggregator usage data 430 record, each record in a set of lower-level summarized aggregator usage data 430 that contributed to the summary information for the higher-level record may be queried for in the lower-level summarized aggregator usage data 430. Further, to retrieve the set of raw aggregator usage data 210 records contributing to a record of the higher-level summarized aggregator usage data 430, each unique identifier 410 associated with each of the identified records in the lower-level summarized aggregator usage data 430 may be queried for in the raw aggregator usage data 210.

The summarization of raw aggregator usage data 210 and service provider usage data 220 (and of summarized aggregator usage data 430 and summarized service provider usage data 440) may be performed periodically, such as hourly, daily, weekly, and/or monthly. In some instances, a staging table may be utilized to facilitate the summarization. In such an instance, rather than adding records in the raw aggregator usage data 210 and service provider usage data 220 to a main record table in the ECS database 130, when new usage data is received, the recently received data may be added to the staging table. Upon expiration of a periodic timer, all records in the staging table may be summarized. Then, the records in the staging table may be bulk inserted into the main ECS database 130, and the staging table may be cleared.

In one exemplary approach, each day lower-level summarized service provider usage data 440 may be created for the raw service provider usage data 220. Then, weekly sets of summarized service provider usage data 440 may be created based on the lower-level summarized service provider usage data 440 each week. Finally, monthly sets of summarized service provider usage data 440 may be created based on the weekly sets of summarized service provider usage data 440.

Accordingly, multiple levels of summaries may be created that allow for a user to both view summary data 420 and also access the underlying raw usage data contributing to each records of the summary data 420. For example, a user may access summary data 420 including a monthly summary of usage data. The user may further select a record of the monthly summary data 420 for which to view further details. The system may determine a unique identifier 410 associated of the selected record of the monthly summary data 420, and may query the ECS database 130 to provide a set of daily summary data 420 records retrieved according to the unique identifier 410. The user may further select a record in the daily summary data 420 for which to view further details. The system may accordingly provide a set of raw usage data records retrieved according to the unique identifier 410 of the selected record of the daily summary data 420. The user may then select a record in a raw usage data to view further details. The system may accordingly provide an underlying raw usage data file information of the selected record of the raw usage data records.

Figures 5, 6:
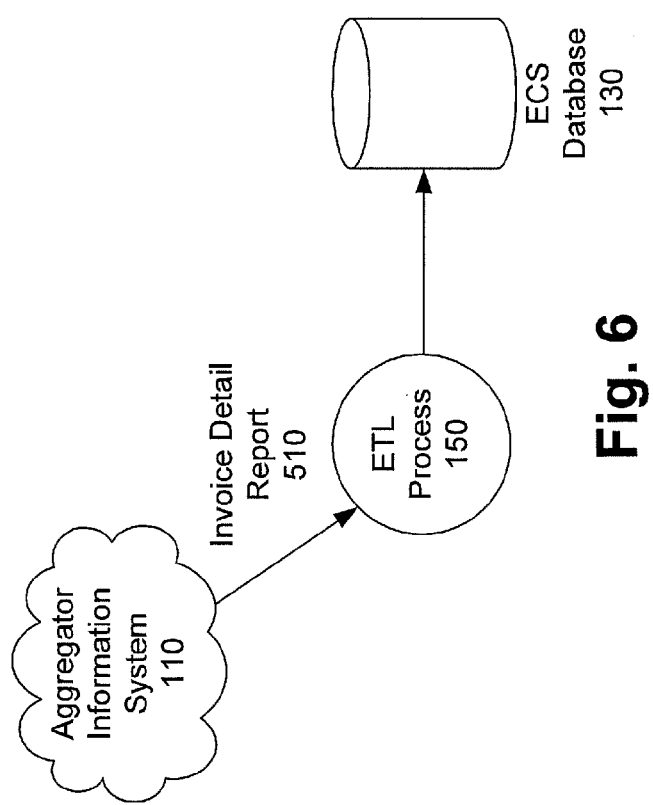
FIG. 5 illustrates an exemplary invoice detail report that may be determined by a service provider or an aggregator.
FIG. 6 illustrates an exemplary data flow for an invoice detail report.

FIG. 5 illustrates an exemplary invoice detail report 510 that may be determined by a service provider or an aggregator. The invoice detail report 510 may include data that summarizes the downloaded products over a particular period of time. For example, the invoice detail report 510 may include total counts and total fees to be paid to the aggregator from the service provider. Additionally, the invoice detail report 510 may further take into account adjustment events in calculating the total fees.

More specifically, the products of the invoice detail reports 510 file may include an itemized list of purchased products. Invoice detail reports 510 may include contextual information including an invoice number, an invoice date, a reference to terms used in producing the invoice, and a due date for the invoice. Moreover, rather than raw download information, the invoice detail reports 510 may include analyzed information including a list of products, quantities, unit prices, and a net amount billed. For example, as illustrated in the figure, the invoice detail reports 510 file may indicate that 443,104 copies of a particular product were downloaded by subscribers, that the count was adjusted by 1,974 to account for various adjustment events, and that the net amount due for the downloads for that product is $1,015,639.77.

FIG. 6 illustrates an exemplary data flow for invoice detail reports 510. As illustrated in FIG. 6, the ETL process 150 as implemented by an ECS server 140 may be configured to receive invoice detail reports 510 from the aggregator information system 110, and forward the invoice detail reports 510 to the ECS database 130.

An invoice detail report 510 file may be made available for download by the ETL process 150, and the ETL process 150 may accordingly be configured to download the invoice detail report 510. In other examples, the invoice detail report 510 may be periodically sent by the aggregator information system 110 to the ECS server 140, and may be received according to the ETL process 150.

The received invoice detail reports 510 file may be stored in a file system, and a reference to the file may be stored in the ECS database 130 along with various metadata, such as the time of receipt of the invoice detail reports 510 file, a hash code associated with the invoice detail reports 510 file, an identifier indicating the period of time for which the invoice detail reports 510 file reports activity, and an identifier indicating the aggregator information system 110 from which the invoice detail reports 510 file was sent.

Thus, the ETL process 150 may extract, transfer and load data including aggregator usage data 210, service provider usage data 220, and invoice detail reports 510 into an ECS database 130. However, these records and reports may differ, such as with respect to one or more transactions, counts, or fee amounts. For example, data collected during the billing period of an invoice detail report 510 may differ from the aggregator usage data 210, and/or the service provider usage data 220. As another example, the aggregator usage data 210 and the service provider usage data 220 may also disagree. These variances may need to be determined and reconciled according to one or more rules regarding the billing records.

Figure 7:
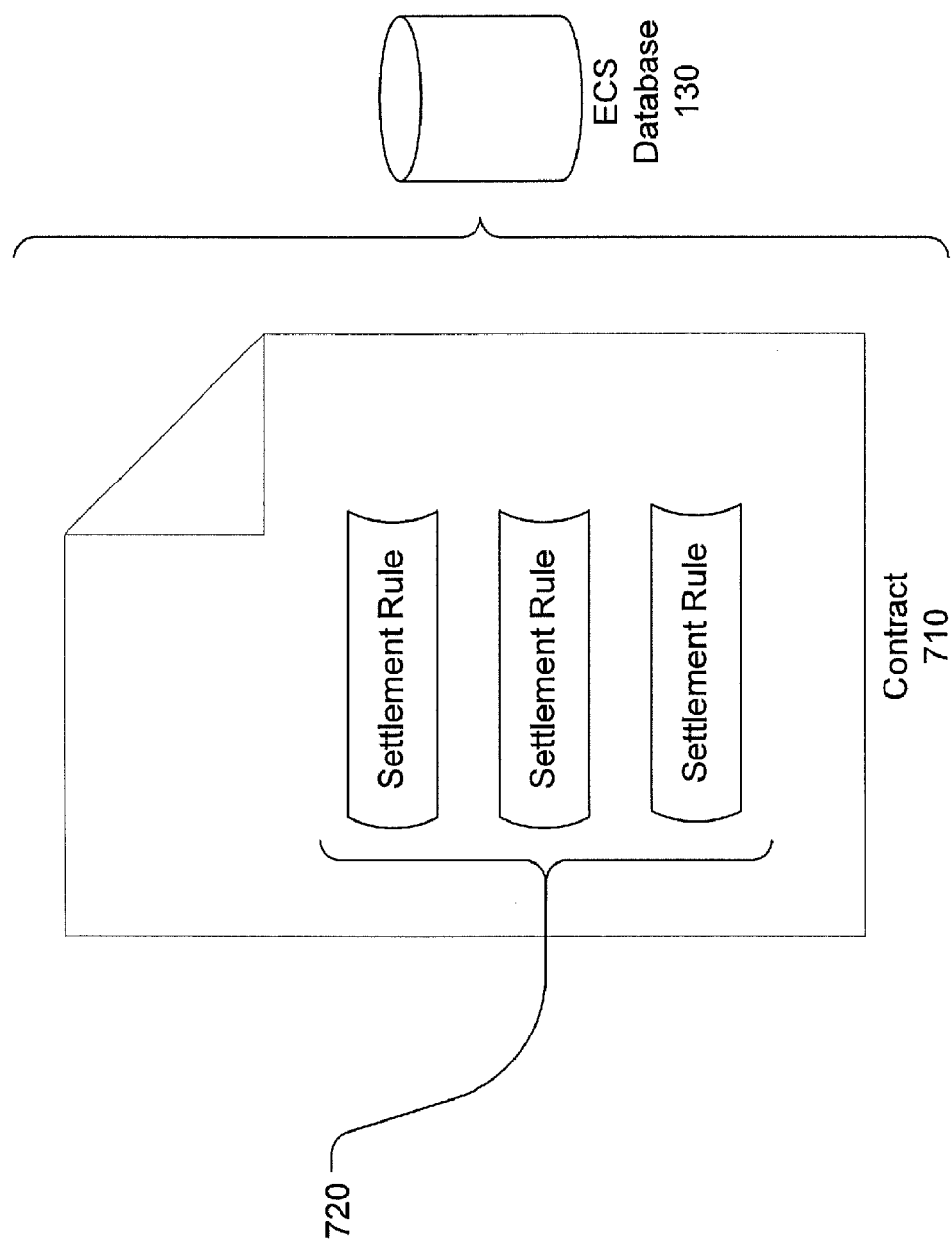
FIG. 7 illustrates an exemplary contract including a plurality of settlement rules.

FIG. 7 illustrates an exemplary contract 710 including one or more settlement rules 720. At least a portion of the contract 710 and the included settlement rules 720 may be stored in the ECS database 130. The ECS database 130 may accordingly be configured to store and selectively retrieve a plurality of contracts 710.

A contract 710 may be an understanding or a more formal agreement or writing between two or more parties. As an example, a contract 710 may be between an aggregator and a service provider. As another example, a contract 710 may be between a service provider and an independent software vendor. A contract 610 may include a set of settlement rules 720 regarding a fee sharing relationship between the parties and relating to the fees collected for subscriber transactions. The contracts 710 may be indexed in the ECS database 130 according to the parties to the contract 710, and may be selectively retrieved according to queries specifying the one or more parties of the contract 710.

The one or more settlement rules 720 may define what portion of a total fee for a transaction may be credited to one party, and what portion may be credited to another party. The one or more settlement rules 720 may also define adjustments to usage data received from the aggregator and/or service provider. Accordingly, through use of the settlement rules 720 included in the contract 710, the portion of fees for a service provider and the portion for an aggregator may be determined for one or more sets of usage data.

As an example of a settlement rule 720 that defines a record adjustment, a settlement rule 720 may define transactions that are excluded from billing, such as transactions that are not relevant to the aggregator being billed, invalid transactions or transactions that cannot be billed due to transactions that fall outside of the invoice period, and the first 500 transactions not billed. A settlement rule 720 may also define transactions that are not billed due to being associated with a backup and restore operation from an old device to a new device. A settlement rule 720 may also define transaction not be billed due to inclusion of a clearly erroneous price. Or, a settlement rule 720 may define a transaction adjustment, such as a full or partial credit to a subscriber and a full or partial debit to an aggregator or vendor. As yet another example, a settlement rule 720 may alter transaction amounts to account for direct-pay vendors, which are paid directly and not through an aggregator.

Settlement rules 720 may define fee apportionments various types. One type of settlement rule may specify a flat fee to be credited to a party of the contract 710. As an example, a flat fee settlement rule 720 may specify to credit an aggregator $0.15 per transaction completed through use of the aggregator, regardless of the cost of the transaction. Another type of settlement rule may specify a percentage-based fee to be credited to a party. An example of a percentage-based fee may be to credit an aggregator 20% of a cost associated with a transaction.

Settlement rules 720 may vary according to the number of times a product is downloaded. In some instances, a set of tiers may be defined as ranges of quantities of downloads for a product or products, and the settlement rules 720 to apply for the product downloads may be defined according to tier. As an example, a first tier may be defined for the first 200 downloads of the month, such that a percentage-based fee of 30% may be credited to a vendor for each download in the first tier. A second tier may be defined for the next 300 downloads of the month such that a percentage-based fee of 20% may be credited to the vendor. A third tier may be defined for all additional downloads such that a flat fee of $1.25 per download may be credited to the vendor for each additional download.

As indicated above, an aggregator may provide its own products for download, and may also aggregate its products along with products from other vendors into a common download source. Accordingly, the aggregator may provide distribution services to one or more vendors. In some instances the aggregator may also provide fee collection services to one or more of the vendors for whom the aggregator provides distribution services. In other instances, vendors that depend on the aggregator for distribution may perform their own fee collection and settlement services with a service provider directly. Vendors that are paid directly by the service provider may be referred to as direct-pay vendors, while vendors for whom an aggregator handles payment for the vendor may be referred to as indirect-pay vendors. In instances involving a direct-pay vendor instead of an aggregator, with regard to settlement the direct-pay vendor may be treated as an aggregator who sells his own products.

A contract 710 between the service provider and the aggregator may be used to settle charges between the service provider and the aggregator according to a set of settlement rules 720. Additionally, a contract 710 between the service provider and a direct-pay vendor may be used to settle charges between the service provider and the vendor according to a second set of settlement rules 720. Accordingly, a settlement process may involve multiple parties and multiple contracts 710 and settlement rules 720.

Figures 8, 9:
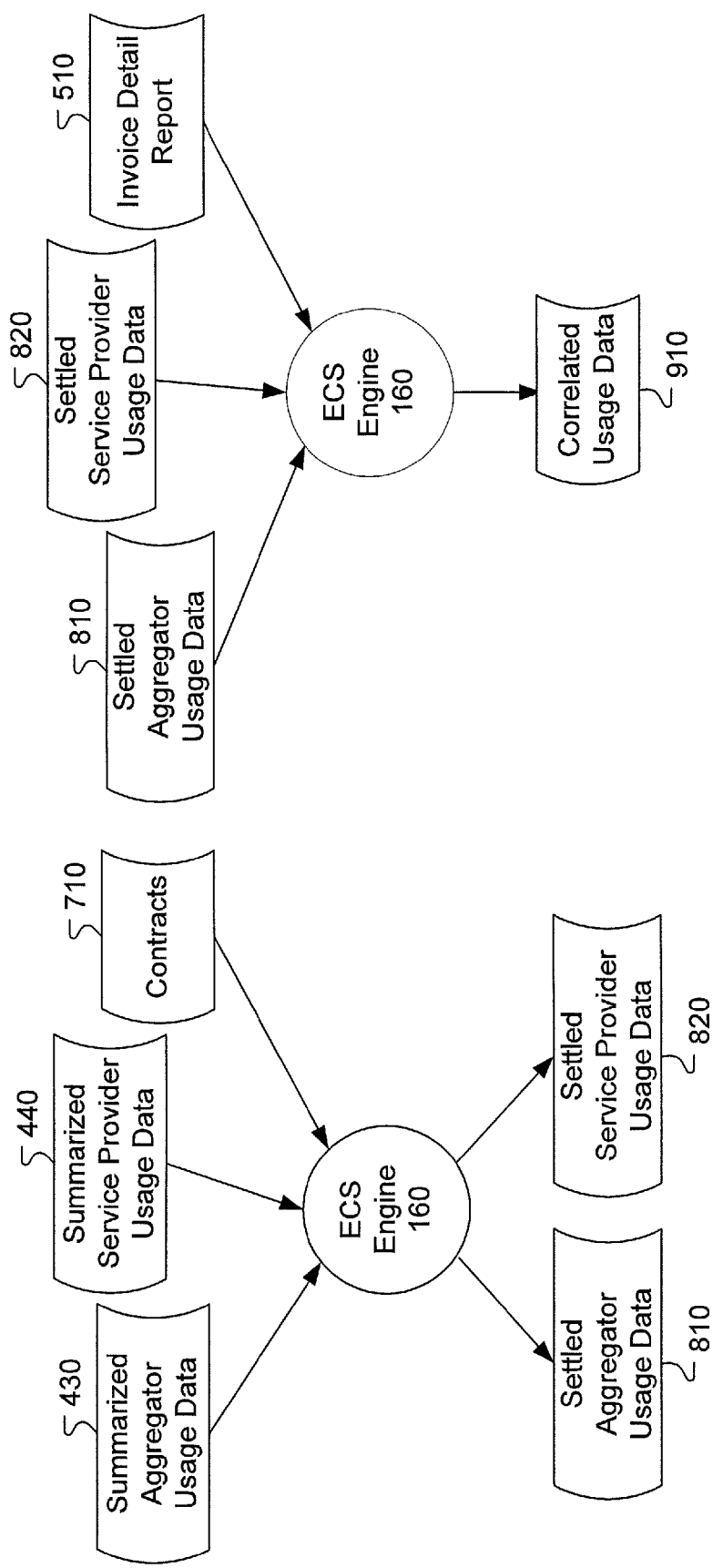
FIG. 8 illustrates an exemplary data flow for settlement of aggregator usage data and service provider usage data.
FIG. 9 illustrates an exemplary data flow for correlating settled aggregator usage data, settled service provider usage data, and invoice detail reports.

FIG. 8 illustrates an exemplary data flow for settlement of summarized aggregator usage data 430 and summarized service provider usage data 440. As illustrated in the Figure, the ECS engine 160 may be configured to settle summarized aggregator usage data 430 into settled aggregator usage data 810 through use of a contract 710. The ECS engine 160 may further be configured to settle raw or summarized service provider usage data 440 into settled service provider usage data 820 according to the same contract 710.

Generally, settlement includes applying one or more settlement rules 720 included in a contract 710 to a set of usage data. For example, the rules of a contract 710 may be applied to aggregator usage data 210 data to determine a set of settled aggregator usage data 810. As another example, the same rules of the contract 710 may be applied to service provider usage data 220 to determine a set of settled service provider usage data 820.

In some instances, the settlement rules 720 may be applied to summary versions of the usage data rather than to the raw usage data records themselves. Applying the settlement rules 720 to the summarized aggregator usage data 430 and the summarized service provider usage data 440 may facilitate settlement due to the reduction in the quantity of data to be retrieved from the ECS database 130. This reduction in the quantity of required data may improve performance of the ECS engine 160, including improving the speed of settlement and decreasing the amount of database access and processor time required to perform settlement operations.

The one or more contracts 710 used to settle the usage data may be determined based on one or more sources of the usage data, and based on the content of the usage data. For example, a contract 710 may exist between a particular aggregator and service provider from whom usage data may be received. Accordingly, the ECS engine 160 may query the ECS database 130 for a contract 710 associated with the particular aggregator and service provider. As another example, a second contract 710 may exist between a service provider and a direct-pay vendor from whom products were downloaded. Which vendors are applicable may be determined according a query of the usage data, such as the service provider usage data 220. Accordingly, the ECS engine 160 may further query the ECS database for a contract 710 associated with the particular aggregator and vendor.

Once received, the one or more contracts 710 may be received and used to settle the aggregator usage data 210 data or summarized aggregator usage data 430 received from the aggregator information system 110 of the particular aggregator. The settlement rules 720 included in the received one or more contract 710 may be applied to the raw or summarized aggregator usage data 210 or 430 to determine a portion of the fees to be paid to the service provider, a portion to be paid to the aggregator and/or a portion to be paid to the vendor according to the aggregator usage data 210 data.

For example, a settlement rule 720 of a contract 710 may be applied that removes transactions outside of the invoice period. As another example a settlement rule 720 may allocate eighty percent (80%) of a fee for a transaction to an aggregator, and twenty percent (20%) of the fee to the service provider. The count of downloads by product and total fees by product may therefore be determined based on the settlement rules 720 of the contract 710. This information may be included in the settled aggregator usage data 810.

Additionally, the contract 710 between the aggregator and service provider may be used to settle the service provider usage data 220 or summarized service provider usage data 440 received from the service provider information system 120. For example, the settlement rules 720 may similarly be applied to the raw or summarized service provider usage data 220 or 440 to exclude inappropriate transactions, and to determine a portion of the fees to be paid to the service provider, and a portion to be paid to the aggregator. The resulting information may be included in the settled service provider usage data 820.

Importantly, the fees determined by applying the settlement rules 720 of the contract 710 to the summarized aggregator usage data 430 and to the summarized service provider usage data 440 may differ. In other words, the fees and counts included in the settled aggregator usage data 810 and the settled service provider usage data 820 may differ. The differences and similarities in the settled aggregator usage data 810 and the settled service provider usage data 820 may be correlated to determine the one or more variances between the sets of data. The settled aggregator usage data 810 and the settled service provider usage data 820 may also be compared against an invoice detail report 510 for the corresponding period to determine variances between the sets of usage data and the invoice detail report 510.

FIG. 9 illustrates an exemplary data flow for correlating settled aggregator usage data 810, settled service provider usage data 820, and invoice detail reports 510 into correlated usage data 910. As illustrated in FIG. 9, the ECS engine 160 may be configured to perform one or more two-way and/or three-way comparisons of at least two of the settled aggregator usage data 810, settled service provider usage data 820, and invoice detail reports 510. Based on the comparisons, the ECS engine 160 may determine variances between or among the settled aggregator usage data 810, settled service provider usage data 820, and invoice detail reports 510. As an example, the ECS engine 160 may determine variances between the settled aggregator usage data 810 from an aggregator and an invoice detail report 510 also provided by the aggregator. As another example, the ECS engine may determine variances between the settled service provider usage data 820 provided by a service provider and the settled aggregator usage data 810 or an invoice detail report 510 provided by the aggregator.

Variances may include transactions included in one data source but not in another. Variances may also include transactions listed in multiple data sources, but that are assigned different fees or counts. Exemplary variances may include a transaction appearing in the settled aggregator usage data 810, but not in the settled service provider usage data 820, a transaction appearing in the settled service provider usage data 820, but not in the settled aggregator usage data 810, and a transaction appearing in the invoice detail report 510, but not in the settled aggregator usage data 810, among others. Additional exemplary variances may include a transaction in the settled aggregator usage data 810 associated with one charge amount or count, and a corresponding transaction in the settled service provider usage data 820 but associated with a second different charge amount or count.

Variances may be determined by querying the records in the ECS database 130 for specific information that may be combined and compared. In some instances, a database join may be used to combine records from multiple data sets. A join predicate may identify a set of records for joining, where if the join predicate is satisfied then the fields of the records may be combined together into an aggregator data set. An example join predicate may include a predicate where one or more fields in a first data set are equal to one or more fields in a second data set.

One type of join is an inner join. An inner join compares each row of a first data set with each row of a second data set to find all pairs of rows which satisfy the join predicate. When the join predicate is satisfied, column values for each matched pair of rows in the first and second data sets are combined into a row of a result data set. For a record to appear in the result data set, matching records must be included in both data sets being combined. Accordingly, records appearing in one data set without matching records in the other data set do not appear in the result data set.

Another type of join is an outer join. In an outer join, a joined data set may include records from one data set even if no other matching record exists. A left outer join may include all the records of the left table, plus either matching records from the right data set if the join predicate is satisfied, or NULL values for each field from the right data set otherwise. In contrast to a left outer join, a right outer join may include all the records of the right table, plus either matching records from the left data set in if the join predicate is satisfied, or NULL values for each field from the left data set otherwise. A full outer join combines the results of both left and right outer joins, where the joined data set will contain all records from both data set, and fill in NULL values for missing matches on either side.

Database joins may be used to combine data to aid in the determination of variances. For example, to determine a set of transactions included in an invoice detail report 510, but not in the settled aggregator usage data 810, the ECS engine 160 may perform a left outer join of a table including the invoice detail report 510 information with a table including the settled aggregator usage data 810. For instance, a left outer join may be performed where the join predicate identifies records where the vendor and product name in the invoice detail report 510 are equal to the vendor and product name in the settled aggregator usage data 810. Likewise, to determine a set of transactions included in the settled aggregator usage data 810 but not in the invoice detail report 510, the ECS engine 160 may perform a right outer join of a table including the invoice detail report 510 information with a table including the settled aggregator usage data 810. For instance, a right outer join may be performed where a join predicate identifies records where the vendor and product name are equal between the tables being combined.

As another example, to determine a set of transactions that the invoice detail report 510 and the settled aggregator usage data 810 have in common, the ECS engine 160 may perform an inner join of a table including the invoice detail report 510 information with a table including the settled aggregator usage data 810. For instance, an inner join may be performed where the vendor and product name are equal between the tables. Then, one or more fields of the resultant data set, such as counts, adjustment counts, usage amounts, adjustment amounts, and net usage amounts may be compared. The ECS engine 160 may then determine differences between corresponding fields. For example, the ECS engine 160 may subtract a count field in one set of usage data from a corresponding count field in a second set of usage data to determine a count difference. Any non-zero values in the count difference would accordingly indicate variances between the two count fields. These sets of joined data fields and compared data fields may be referred to as correlated usage data 910.

Additional correlated usage data 910 may be determined through comparison of additional or alternate sets of data. For example, settled service provider usage data 820 may be used instead of settled aggregator usage data 810 or the invoice detail report 510 as a source of data to compare.

FIG. 10 illustrates exemplary correlated aggregator usage data 910 between settled aggregator usage data 810 and settled service provider data 820. Merely by way of example, correlated usage data 910 may include records indicating the counts for each product for an invoice detail report 510 and settled aggregator usage data 810, differences in the counts between the data sources, adjustment counts for the invoice detail report 510 and the settled aggregator usage data 810, differences in the adjustment counts comparing the data sources, usage amounts, and differences in the usage amounts. Additionally, in other examples the correlated usage data 910 may include further information, such as adjustment amounts for the data sources being correlated, and differences in the adjustment amounts.

Further, the ECS engine 160 may determine a cause for at least one variance in the correlated usage data 910.

For example, a set of variances may cluster around a particular time period, potentially indicating that, for example, an aggregator usage data 210 file may have been truncated or that a system temporarily failed to record usage data.

As another example, an entire period of time, such as thirty (30) minutes, may be missing from a particular set of data. The ECS engine 160 may therefore determine that the variances may have been caused by an entire file being missed or otherwise omitted in the creation of an invoice detail report 510.

As yet another example, whenever a certain set of circumstances occur (such as a purchase of a product of a particular price from a certain vendor or at a particular time of day) a variance between two sets of data may be identified. Accordingly, the ECS engine 160 may determine that a settlement rule 720 of the contract 710 may potentially be interpreted differently by the service provider and by the aggregator. For example, the ECS engine 160 may determine that for the settled service provider usage data 820 one settlement rule 720 of the contract may be being invoked, while for the invoice detail report 510 a second settlement rule 720 of the contact may be being invoked.

The ECS engine 160 may also determine whether different versions of the contract 710 may be utilized by the service provider and the aggregator. In some instances, due to later negotiations one or more terms of a contract 710 between the service provider and aggregator may be altered. The updated contract 710 may first take effect at a particular time, but one or more of the service provider and aggregator may fail to update to use the updated version of the contract 710. Based on the amounts credited by the service provider and the aggregator, the ECS engine 160 may note a variance. Then, based on the one and updated versions of the contract 710, the ECS engine 160 may determine that one or more of the service provider and aggregator neglected to update to the new contract 710 at the designated time.

These, and other conclusions based on the variances may also be included in the correlated usage data 910.

FIG. 11 illustrates an exemplary data flow for generating variance reports 180. As illustrated in the Figure, one or more of aggregator usage data 210, service provider usage data 220, summarized aggregator usage data 430, summarized service provider usage data 440, settled aggregator usage data 810, settled service provider usage data 820, and correlated usage date 910 may be included in one or more variances reports 180 generated by a report generator 170.

A variance report 180 may be a report including the variances and causes determined by the ECS engine 160. Variance reports 180 may be delivered in a format indicated by a user of the reporting system, such as one or more of Microsoft Word format, Adobe PDF format, Microsoft Excel format, and HTML format, among others. Variance reports 180 may further be created according to a defined schedule or event. As some examples, variance reports 180 may be generated periodically (e.g., daily, monthly, etc.) and upon notification of receipt of an invoice detail report 510 by the ECS engine 160.

Variance reports 180 may include details of the variances determined by the ECS engine 160. For example, a variance report 180 may include usage count differences between two or more sets of usage data, adjustment count differences between two or more sets of data, differences in charge amounts between two or more sets of usage data, differences in adjustments between two or more sets of data, and products found only in one set of data but not the other. Alternately or additionally, a variance report 180 may include a summary including top variances according to count, top variances in net charge amount, variances sorted according to vendor, variances sorted according to product name, and trends indicating the differences in variance quantity between reporting periods. A variance report 180 may further include potential causes for the variances as determined by the ECS engine 160.

In addition to the summary information and counts, the variance report 180 may further include supporting details from summarized usage data and/or raw usage data, including, for example, the supporting data used to generate the variances and summary information. In some instances, the supporting details may be included in the variance report 180 in a navigable form, such as through use of hyperlinks in a set of HTML documents. The supporting details may be determined in part through use of the unique identifiers 410 associated with the summarized aggregator usage data 430 and summarized service provider usage data 440, as well as through use of the raw aggregator usage data 210 and service provider usage data 220 and any originally received usage data files. These and other relevant supporting details may be used to provide reviewable documentation for a quick and efficient dispute resolution procedure between one or more parties related to one or more charged amounts.

As an example, a variance report 180 may be implemented in HTML format and may include list of differences charge amount based on differences in counts between aggregator usage data 210 received from an aggregator and service provider usage data 220 received from a service provider. These details regarding the differences in counts may be determined according to the correlated usage data 910, for example such as illustrated above in FIG. 10. Each difference item may be implemented as an HTML link that when clicked navigates to an HTML page including details of the difference in counts broken down according to product. These details may be retrieved, for example, from the summarized aggregator usage data 430 and summarized service provider usage data 440 when queried according to product. Each of the summarized aggregator usage data 430 and summarized service provider usage data 440 items may be implemented as links that when clicked navigate to a view of the raw data items used to generate the summarized aggregator usage data 430 and summarized service provider usage data 440 items. These details may be determined according to a unique identifier 410 associated with the selected record of the summarized aggregator usage data 430 or summarized service provider usage data 440. The unique identifier 410 of the selected record may be queried for in the ECS database 130 to provide a set of a set of raw aggregator usage data 210 records or raw service provider usage data 220 associated with the unique identifier 410. Each of the raw data items may be implemented as links that when clicked allow for access to the original raw data file information from which the raw data items were imported into the ECS database 130.

The report generator 170 may generate additional types of reports. As an example, the report generator 170 may generate daily control reports. A daily control report may include a list of each of the processes that may have been executed over for a period of time. An exemplary data control report may include data such as process identifier, and for each process identifier an amount of time for which the process ran, a number of records processed for the process, and a number of records for which an error was determined by the process.

As another example, the report generator 170 may generate fallout reports. A fallout report may include information regarding records that could not be processed due to one or more errors, including the process which determined that an error may have occurred. For example, the process identifier may identify a process that added a record to the ECS database 130, or the process that loaded and processed a record previously added. A fallout report may identify a number of records processed, a number of records successfully processed and a number of error records. The fallout report may further indicate the types of error, such as that a record was unable to be processed due to inability to find a relevant contract, that the contract was found but included no relevant rule, that no contract identifier was specified in the record to allow for contract lookup, and that the vendor identifier was unknown to the system.

Figure 12:
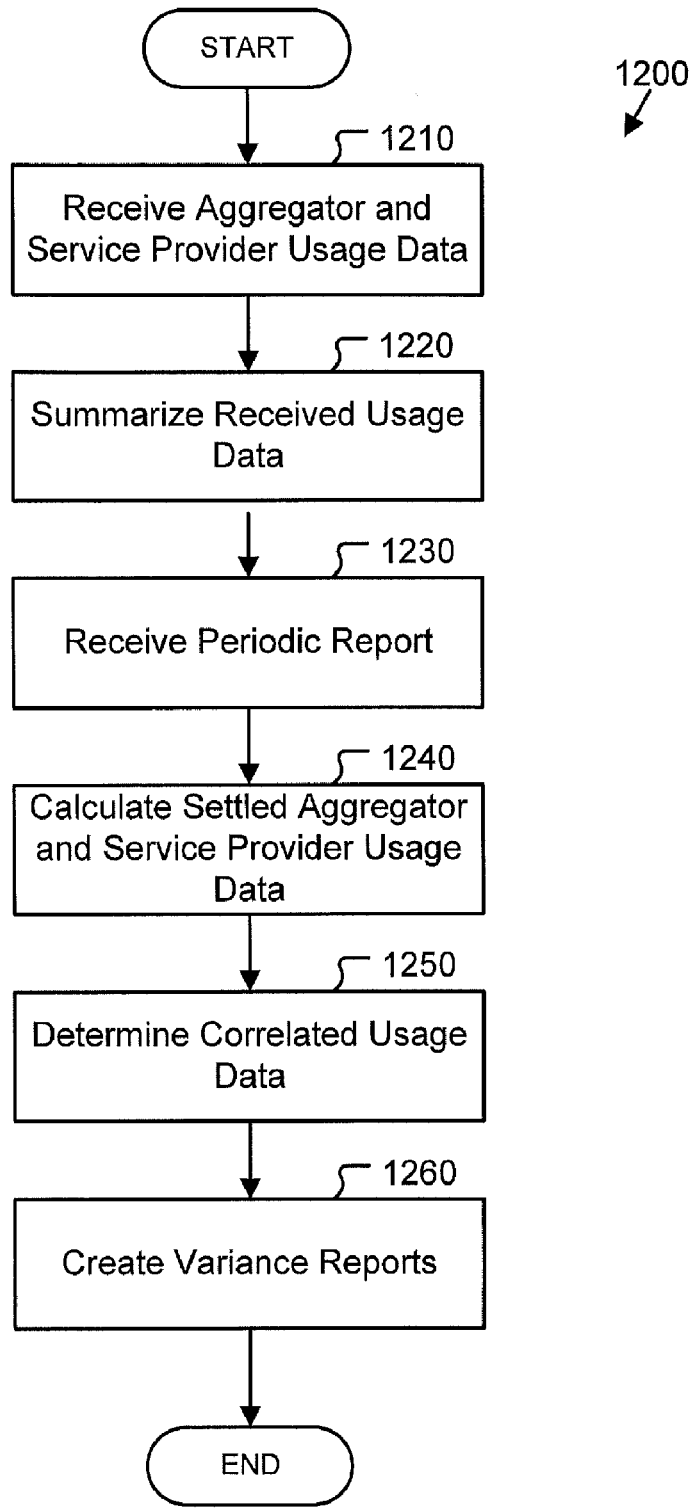
FIG. 12 illustrates an exemplary process flow for reconciling billing data between a service provider and an aggregator.

FIG. 12 illustrates an exemplary process flow 1200 for reconciling billing data between a service provider and an aggregator.

In block 1210, the ETL process 150 may receive aggregator usage data 210 and service provider usage data 220. For example, an aggregator usage data 210 file may be made available for download by the ETL process 150, and the ETL process 150 may accordingly be configured to download the aggregator usage data 210. In other examples, the aggregator usage data 210 file may be periodically sent by the aggregator information system 110 to the ECS server 140, and may be received according to the ETL process 150. As another example, a service provider usage data 220 file may be made available for download by the ETL process 150, and the ETL process 150 may accordingly be configured to download the service provider usage data 220. In other examples, the service provider usage data 220 file may be periodically sent by the service provider information system 120 to the ECS server 140, and may be received according to the ETL process 150.

In block 1220, the ETL process 150 may summarize the received aggregator usage data 210 and service provider usage data 220. The ETL process 150 may create summarized aggregator usage data 430 from the received aggregator usage data 210 and summarized service provider usage data 440 from the service provider usage data 220. For example, summarized aggregator usage data 430 may be created by combining similar data rows of the received aggregator usage data 210 into a single data row with a count field or any other summarized fields (e.g., sum of charge amounts) to indicate the number of combined records, and by including only relevant data fields of received aggregator usage data 210 and excluding data fields that are not be required for later data processing. The ETL process 150 may link back the summarized aggregator usage data 430 and summarized service provider usage data 440 to the raw aggregator usage data 210 and raw service provider usage data 220. These links may allow for detailed analysis and later reporting regarding of the underlying data used to generate the summarized aggregator usage data 430 and summarized service provider usage data 440. The ETL process 150 may perform an initial summarization when a file is loaded, such as hourly, daily, weekly, and/or monthly. In some examples, the ECS engine 160 may create further higher-level summaries based on previously created summarized aggregator usage data 430 and summarized service provider usage data 440. In some instances, a first set of summaries may be created by the ETL process 150 when records are added to the ECS database 130, and further summaries may be created by the ECS engine 160.

In block 1230, the ETL process 150 may receive an invoice detail report 510. For example, an invoice detail report 510 file may be made available for download by the ETL process 150, and the ETL process 150 may accordingly be configured to download the invoice detail report 510. In other examples, the invoice detail report 510 may be periodically sent by the aggregator information system 110 to the ECS server 140, and may be received according to the ETL process 150.

In block 1240, the ECS engine 160 may calculate settled aggregator usage data 810 and settled service provider usage data 820. For example, the ECS engine 160 may query the ECS database 130 for at least a portion of a contract 710 associated with the particular aggregator and service provider. As another example, the ECS engine 160 may query the ECS database 130 for at least a portion of a contract 710 associated with the service provider and a vendor of a product identified in the usage data. The settlement rules 720 of the retrieved portions of the contracts 710 may be applied to the raw aggregator usage data 210 data or to the summarized aggregator usage data 430 to determine a set of settled aggregator usage data 810. As another example, the same settlement rules 720 of the contracts 710 may be further applied to the raw service provider usage data 220 or to the summarized service provider usage data 440 to determine a set of settled service provider usage data 820.

In block 1250, the ECS engine 160 may determine correlated usage data 910. For example, the ECS engine 160 as implemented by an ECS server 140 may be configured to perform one or more two-way and/or three-way comparisons of at least two of the settled aggregator usage data 810, settled service provider usage data 820, and invoice detail reports 510. Based on the one or more comparisons, the ECS engine 160 may determine variances between or among the settled aggregator usage data 810, settled service provider usage data 820, and invoice detail reports 510. These variances may be compiled into correlated usage data 910. Based on the variances, the ECs engine 160 may further determine potential causes for the variances in the correlated usage data 910.

In block 1260, the report generator 170 may generate a variance report 180. For example, one or more of aggregator usage data 210, service provider usage data 220, summarized aggregator usage data 430, summarized service provider usage data 440, settled aggregator usage data 810, settled service provider usage data 820, and correlated usage date 910 may be included in one or more variances reports 180 generated by a report generator 170. In some instances, variance reports 180 may be generated daily, monthly, and upon receipt of an invoice detail report 510, and may be delivered in a format indicated by a user of the report generator 170.

Next, the process 1200 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:
1. A system, comprising:
an enterprise content settlement server including:
an extract, transfer and load process configured to receive a first set of usage data from a first party and a second set of usage data from a second party; and
an enterprise content settlement engine configured to:

settle said first set of usage data according to a contract including at least one settlement rule defining an apportionment between said first party and said second party of fees indicated in said usage data; and settle said second set of usage data according to said contract including said at least one settlement rule.

2. The system of claim 1, wherein said first set of usage data includes usage data from a service provider and said second set of data includes usage data from an aggregator.

3. The system of claim 2, wherein said contract defines a fee sharing relationship between said aggregator and said service provider.

4. The system of claim 1, further comprising an enterprise content settlement database in selective communication with said enterprise content settlement server, wherein said extract, transfer and load process is further configured to send said first set of usage data and said second set of usage data to said enterprise content settlement database for storage.

5. The system of claim 4, wherein said enterprise content settlement engine is further configured to query said enterprise content settlement database for at least a portion of said contract.

6. The system of claim 1, wherein at least one of said first set of usage data and said second set of usage data includes an invoice detail report.

7. The system of claim 1, wherein said enterprise content settlement engine is further configured to:
create a set of correlated data based on said settled first set of usage data and said settled second set of usage data; and
identify at least one variance based on said set of correlated data.

8. The system of claim 7, wherein said set of correlated data includes a data set created by way of an inner join of said first set of usage data and said second set of usage data.

9. The system of claim 7, wherein said enterprise content settlement engine is further configured to at least one of:
determine at least one variance indicating a transaction included in one data source but not in another; and
determine a transaction assigned a fee in said first set of usage data and assigned a different fee in said second set of usage data.

10. The system of claim 7, wherein said enterprise content settlement engine is further configured to determine a cause for said at least one variance including at least one of:
(i) to determine that an entire file was omitted in at least one of said first set of usage data and said second set of usage data;
(ii) to determine that a settlement rule of said contract is being interpreted differently by said service provider and said aggregator; and
(iii) to determine that at least one of the service provider and the aggregator failed to apply an updated version of said contract at a designated time.

11. The system of claim 7, further comprising a report generator in selective communication with said enterprise content settlement server and configured to:
receive said correlated data; and
generate a variance report based on said correlated data.

12. The system of claim 11, wherein said report generator is further configured to generate said variance report at least one of periodically and according to notification of receipt of a set of usage data by said enterprise content settlement engine.

13. The system of claim 11, wherein said report generator is further configured to include a cause for a variance determined by said enterprise content settlement engine in said variance report.

14. A method, comprising:
receiving a set of service provider usage data from a service provider;
receiving a set of aggregator usage data from an aggregator;
receiving, by an enterprise content settlement server, at least a portion of a contract between the service provider and the aggregator including at least one settlement rule defining an apportionment between the service provider and the aggregator of fees indicated in the usage data;
settling the set of service provider usage data by the enterprise content settlement server according to the at least one settlement rule; and
settling the set of aggregator usage data by the enterprise content settlement server according to the at least one settlement rule.

15. The method of claim 14, wherein the contract defines a fee sharing relationship between the aggregator and the service provider.

16. The method of claim 14, further comprising:
summarizing the set of service provider usage data into summarized service provider usage data;
summarizing the set of aggregator usage data into summarized aggregator usage data; and
settling the set of service provider usage data and settling the set of aggregator usage data through use of the summarized service provider usage data and the summarized aggregator usage data.

17. The method of claim 14, further comprising:
creating a set of correlated data based on the set of settled service provider usage data and the set of settled aggregator usage data; and
identifying at least one variance based on the set of correlated data.

18. The method of claim 17, further comprising determining a cause for the at least one variance including at least one of:
(i) determining that an entire file was omitted in at least one of the set of service provider usage data and the set of aggregator usage data;
(ii) determining that a settlement rule of the contract is being interpreted differently by the service provider and the aggregator; and
(iii) determining that at least one of the service provider and the aggregator failed to apply an updated version of the contract at a designated time.

19. The method of claim 17, further comprising generating a variance report based on the correlated data.

20. A computer-readable medium tangibly embodying computer-executable instructions comprising:
receiving a set of service provider usage data from a service provider;
receiving a set of aggregator usage data from an aggregator;
receiving at least a portion of a contract between the service provider and the aggregator including at least one settlement rule defining an apportionment between the service provider and the aggregator of fees indicated in the usage data;
settling the set of service provider usage data according to the at least one settlement rule;
settling the set of aggregator usage data according to the at least one settlement rule;

creating a set of correlated data based on the set of settled service provider usage data and the set of settled aggregator usage data; and identifying at least one variance based on the set of correlated data.

21. The computer-readable medium of claim 20, wherein the contract defines a fee sharing relationship between the aggregator and the service provider.

22. The computer-readable medium of claim 21, further comprising determining a cause for the at least one variance including at least one of:

(i) determining that an entire file was omitted in at least one of the set of service provider usage data and the second set of aggregator usage data;

(ii) determining that a settlement rule of the contract is being interpreted differently by the service provider and the aggregator; and (iii) determining that at least one of the service provider and the aggregator failed to apply an updated version of the contract at a designated time.

23. The computer-readable medium of claim 20, further comprising generating a variance report based on the correlated data.

* * * * *